United States Patent [19]
Crawford et al.

[11] 3,964,714
[45] June 22, 1976

[54] MATERIAL UNLOADING IMPLEMENTS

[75] Inventors: Alexander Crawford, Guy's; Alfred J. Bailey, Berkswell, both of England

[73] Assignee: Massey-Ferguson Services N.V., Curacao, Netherlands

[22] Filed: May 8, 1975

[21] Appl. No.: 575,566

[30] Foreign Application Priority Data
May 10, 1974 United Kingdom............... 20667/74
Dec. 11, 1974 United Kingdom............... 53600/74

[52] U.S. Cl................................ 239/662; 239/672; 239/679
[51] Int. Cl.².......................................... A01C 23/00
[58] Field of Search ........... 239/658, 662, 672, 676, 239/678, 679, 680

[56] References Cited
UNITED STATES PATENTS
2,360,126 10/1944 Griffiths.......................... 239/662 X
3,025,067 3/1962 Raney et al...................... 239/679 X
3,682,333 8/1972 Krause............................ 239/679 X FOREIGN PATENTS OR APPLICATIONS
564,198 10/1958 Canada.............................. 239/680
1,202,002 1/1960 France.............................. 239/679
927,177 10/1954 Germany............................ 239/676

*Primary Examiner*—John J. Love
*Attorney, Agent, or Firm*—Robert L. Farris

[57] ABSTRACT

A spreader for liquid or solid farmyard manure. The spreader comprises a manure container, an unloading rotor and a manure pusher. The rotor is spaced above the level of the bottom of the container and discharges over the rear wall of the container. The pusher keeps the rotor immersed in manure to the correct depth. In this way both solid and liquid manure can be spread. The rear wall of the container slopes up to the rotor to guide solid manure to the rotor.

7 Claims, 14 Drawing Figures

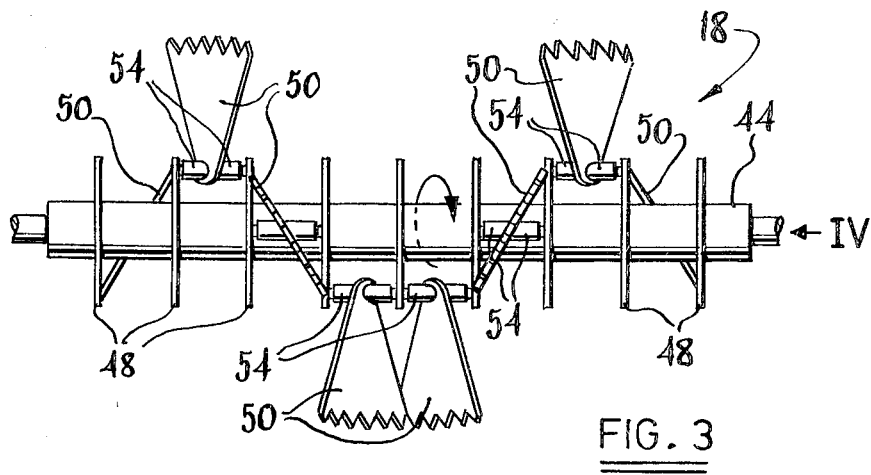
FIG. 3
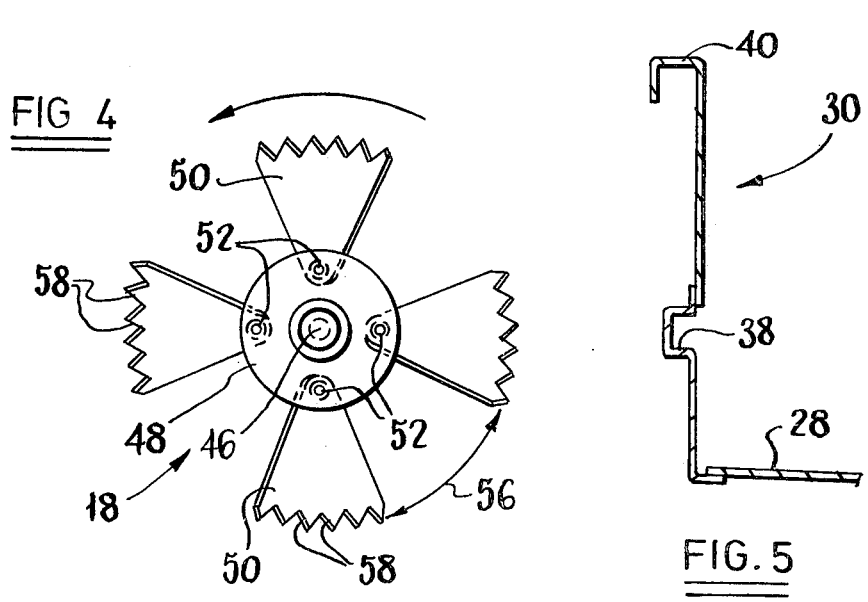
FIG 4
FIG. 5

MATERIAL UNLOADING IMPLEMENTS

This invention relates to material unloading implements, and in particular, though not exclusively, to such implements in the form of farmyard manure spreaders.

Changes in animal husbandry techniques resulting in a large increase in the number of cattle and pigs which are raised in buildings as opposed to open fields have produced a large demand for manure spreaders.

Other factors contributing to this demand are the recent large increases in the price of synthetic fertilizers, and legislation against pollution of rivers by manure lagoons and the like.

To meet this demand, two main kinds of manure spreader are marketed. Each of these is however subject to at least one disadvantage. Firstly, there is the widely used so-called flat bed spreader, which employs a chain and slat conveyor to move manure within a container to a spreading device. This implement is more or less satisfactory for dealing with solid manure but it cannot deal effectively with liquid or semi-liquid manure because the manure container cannot be made liquid-tight and even if a liquid end gate is provided it is difficult to control the flow of material to the spreading device. Furthermore the liquid end gate is an added complication and the flow of liquid past it is such that the spreading device is not sufficiently immersed to be fully effective.

Secondly, there is the spreader disclosed in U.S. Pat. No. 2,886,332. This implement is simple and can be made robust and is able to handle both liquid or semi-liquid manure and solid manure. However, it requires an undesirably high torque to start up its discharge rotor when spreading is commenced. Furthermore, the rate of discharge is low and tends to be uneven, and the spreader is not efficient in spreading thich slurry having a toothpaste-like consistency.

Proposals for further kinds of manure spreaders have also been made but, up to now, these proposals have involved structures which are too complex or too susceptible to damage or are otherwise unsatisfactory for use under agricultural conditions.

An object of the present invention is to provide an improved manure spreader.

According to the invention there is provided a material unloading implement comprising:
a material container;
a material unloading rotor mounted on the material container and operable to unload material therefrom;
material feed means operable to feed material within the container to the material unloading rotor;
characterized in that
the material unloading rotor is mounted on the container adjacent an upwardly extending wall of the container and is operable to unload material from within the container over said wall, the material unloading rotor being mounted at a level such that when the material unloading implement is in its working attitude and is standing on horizontal ground, a horizontal plane touching the lowest point on the circular path described by the radially outermost portions of the rotor is spaced above a horizontal plane touching the lowest point in the material container; and
the material feed means comprises a material pushing member mounted in the material container so as to be movable towards the material unloading rotor, and drive means to move the material pushing member whereby the material pushing member moves material within the container towards the material unloading rotor.

Embodiments of the invention will now be described by way of example with reference to the accompanying drawings, in which:

FIG. 3 shows a material unloading rotor forming part of the implement of FIGS. 1 and 2, and with adjacent structure removed for clarity, the rotor being viewed in the direction indicated by arrow III in FIG. 1;

FIG. 4 shows an end view of the rotor as indicated by arrow IV in FIG. 3;

FIG. 5 shows, in section, a side wall of a material container seen in FIGS. 1 and 2, the section being on the line V—V in FIG. 2;

Figure 1:
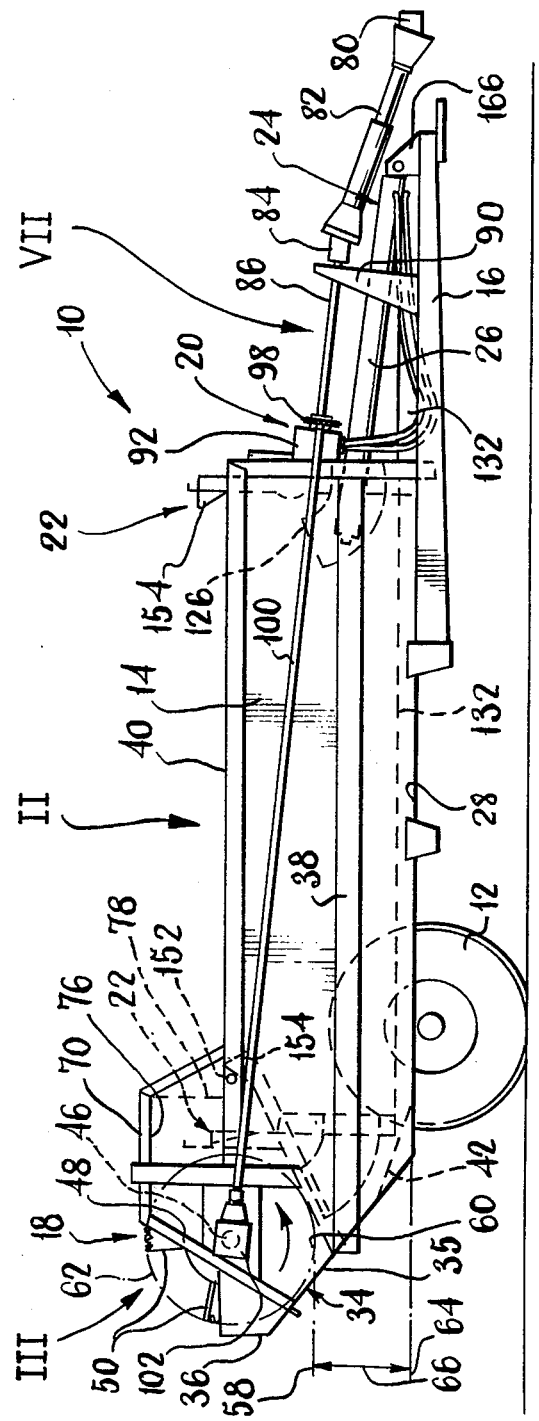
FIG. 1 shows, in side elevation, a manure spreader in its working attitude and standing on horizontal ground.
Figure 2:
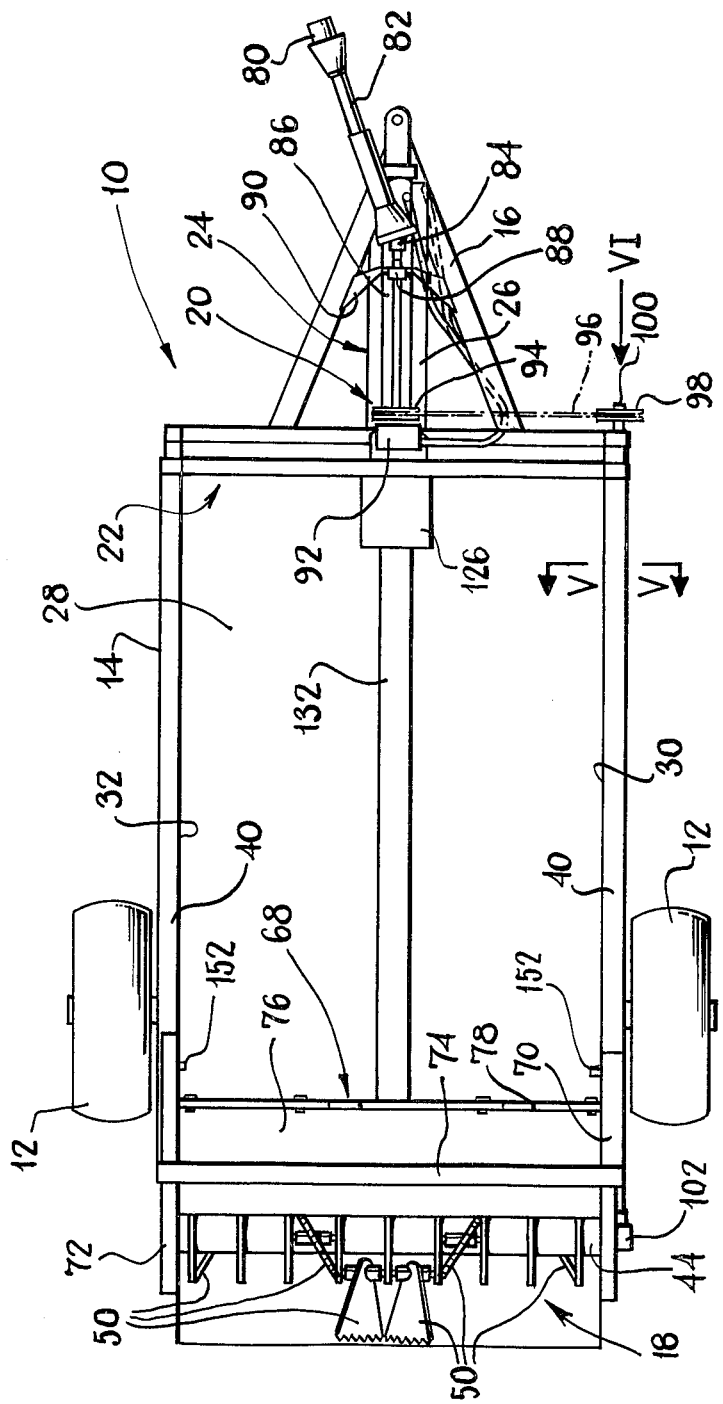
FIG. 2 shows a plan view, of the manure spreader of FIG. 1, as indicated by arrow II in FIG. 1.

The first embodiment of the invention is shown in FIGS. 1 to 8. The material unloading implement is in the form of a farmyard manure spreader 10 comprising the following principal features:
ground wheels 12;
a material container 14 for solid manure or slurry, mounted on the ground wheels;
a drawbar 16 at the forward end of container 14 for connection to a tractor (not shown);
a material unloading rotor 18 mounted at the rear of container 14;
a drive 20 for rotor 18; and
material feed means comprising a material pushing member 22 mounted in material container so as to be movable towards material unloading rotor 18, and drive means 24 in the form of a triple ram 26 to move the material pushing member so as to push manure or slurry to the rotor. Certain of the above-listed principal features of the manure spreader 10 will now be described in greater detail.

Material container 14 comprises horizontal flat base wall 28, vertical side walls 30, 32 and an upwardly and rearwardly extending rear wall 34 having a sloping portion 35 and a short vertical portion 36 at its upper end. The side walls and base wall define an opening at the front of the container which is closed by the material pushing member 22. The side walls are identical in structure and, as shown in FIG. 5, are each formed with a guide 38 in the form of a channel-section outwardly pressed portion and with a flange 40 at their upper edge. The sloping portion 35 of rear wall 34 is largely flat, but includes a short curved lead-in portion 42 to provide a smooth transition from base wall 28.

Material unloading rotor 18 comprises a central shaft 44 mounted on bearings (not shown) for rotation about its longitudinal axis 46 which extends horizontally across the rear of material container 14. Nine metal annular discs 48 are welded to shaft 44 in coaxial relationship therewith and equally spaced apart axially from each other.

Eight flails 50 are pivotally mounted one between each pairs of discs 48 about respective pivot axes 52 which are spaced radially outwardly of the axis 46 of shaft 44. Each flail is generally triangular in shape and is pivotally connected to discs 48 by a pin defining the axis 52 and secured to the discs and extending through a sleeve 54 welded to the flail close to the apex of the flail. The pivot axes 52 of the flails are parallel to the shaft axis. The flails 50 themselves are arranged obliquely with respect to the axes 52 so that the face of each flail which faces forwards with respect to the direction of rotation (indicated by arrows) is inclined towards that end of the shaft 44 which is nearer to the flail.

Flails 50 are distributed around shaft 44 so that the four flails on each side of the central disc 48 of the shaft lie on respective helices, the helices being such as to exert a conveying action towards their respective ends of the shaft. The radially outer end 56 of each flail is formed with serrations 58 to assist in cutting solid-manure.

In FIGS. 1 to 4, for the sake of clarity, the flails are shown in the attitudes they adopt when the rotor is rotating at its normal operating rate under no-load conditions, the flails thus being held in radial attitudes by centrifugal force. When the rotor is stationary, the flails hang downwards or rest on shaft 44.

As shown in FIG. 1, material unloading rotor 18 is mounted on container 14 so that the axis 46 of rotation of the rotor is at about the same level as the surface of liquid when the container is full of slurry. Furthermore, the dimensions of the rotor including its flails are such that a horizontal plane 58 touching the lowest point 60 on the circular path 62 described by the radially outermost portions 56 of the rotor is spaced above a horizontal plane 64 touching the lowest point in the material container 14 (i.e. base wall 28). The spacing 66 between the horizontal planes 58 and 64 is approximately equal to the radius of the circular path 62 described by the ends 56 of the flails 50. This spacing represents the depth of manure which, in a conventional manure spreader arrangement with a manure container having an open rear end, would not be acted upon by the unloading rotor 18.

The material unloading rotor 18 is provided with a shield or hood 68 positioned on the forward side of the rotor and extending partially over the rotor. The hood is supported on two frameworks 70, 72, one at each end of the rotor 18, the frameworks being joined by a spar 74. The hood itself comprises a flanged flat metal plate 76 mounted horizontally above rotor 18 and a rubber skirt 78 bolted to the rear flange of the plate and hanging vertically from it.

The drive 20 for material unloading rotor comprises the following items drivably connected to each other in succession: a universal joint and splined female coupling 80 for connection to a tractor's p.t.o. shaft, a shielded primary drive input shaft 82, a universal joint 84, a secondary drive input shaft 86 supported at one end in bearings 88 on an upstanding bracket 90 mounted on drawbar 16 and at the other end in bearings in a hydraulic pump 92, a sprocket 94 fast with shaft 86, a roller chain 96, a sprocket 98, a third drive shaft 100 and a bevel gearbox 102.

Figure 6:
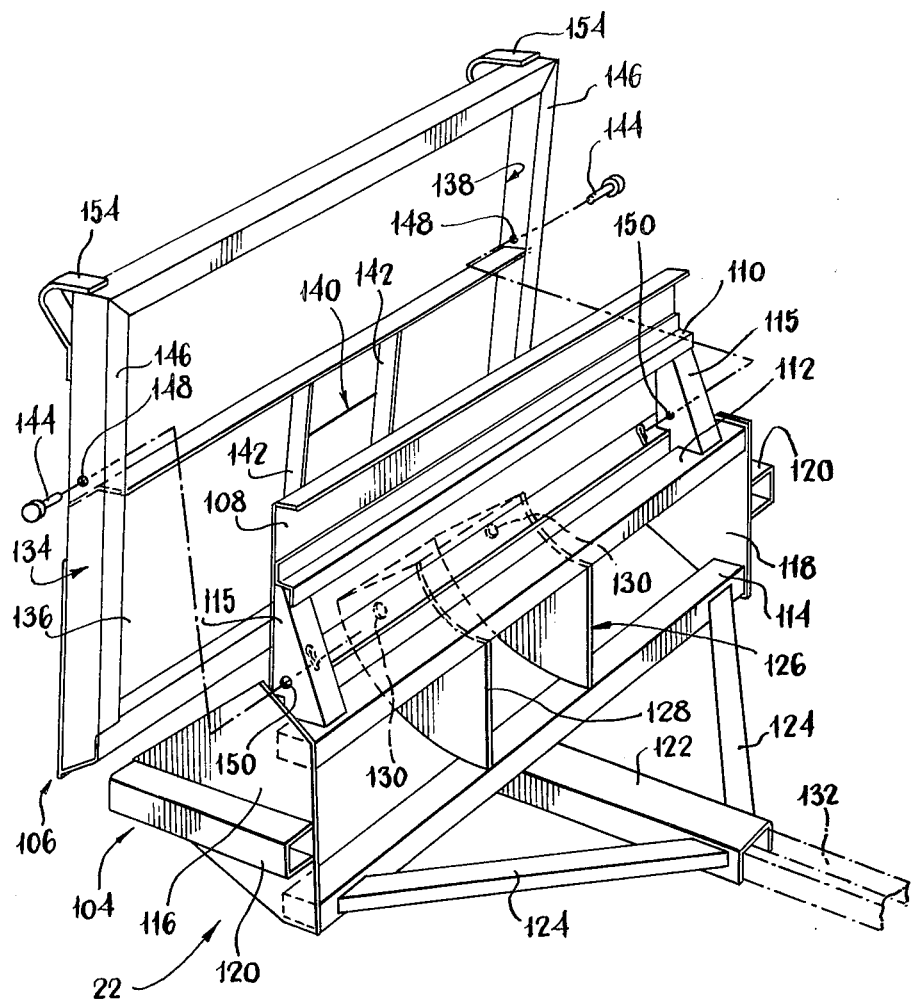
FIG. 6 shows an exploded perspective view from the front and to one side, of a material pushing member also seen in FIGS. 1 and 2, the approximate direction of viewing being indicated by arrow IV in FIG. 2.

The structure of material pushing member 22 is shown in FIG. 6. It is in the form of a wall and can be considered as constituting the front-wall of material container 14. The wall is constituted by first and second wall portions 104, 106 respectively.

First wall portion 104 is a rigid structure comprising at its upper end a pusher plate 108 for engagement with manure, transverse stiffening bars 110, 112, 114, support brackets 115, tapering vertical side plates 116, 118 carrying respective horizontal channel section upper guide elements 120, and a channel-section lower guide element 122 braced by spars 124.

An arcuate box-section nose 126 projects rearwardly from stiffening bars 112, 114 and is securely fastened thereto for the transmission of thrust to the material pushing member. The nose is open at its front 128 and is formed with aligned apertures 130 in its side walls but is otherwise a closed, liquid-tight structure. Guide elements 120 are proportioned so as to be a sliding fit within guides 38 in side walls 30, 32 of material container 14. Guide element 122 is a sliding fit over a box section guide 132 fastened to base wall 28 of container and extending longitudinally down the centre of the container. The guide elements 120 and 122 on first wall portion 104 and their respective guides 38 and 132 on container 14 co-operate to hold the first wall portion in a fixed attitude relative to the container during movement of the material pushing member lengthwise of the container as will be described.

Second wall portion 106 comprises a rectangular frame 134 closed at its lower end by a plate 136 for engagement with the manure and leaving an aperture 138 at the upper end of the wall portion through which plate 108 of the first wall portion can project during use - as will be described.

A central rectangular aperture 140 is formed in plate 136 to receive nose 126. Flanges 142 define the side edges of the aperture.

Second wall portion 106 is pivotally mounted on the rear side of first wall portion 104 by pivot pins 144. The two uprights 146 of rectangular frame 136 fit between support brackets 115 and their respective side plates 116, 118 so that apertures 148 in the uprights become aligned with apertures 150 in the support brackets to receive pins 144.

Actuating means is provided to effect pivotal movement of second wall portion 106 relative to the first wall portion 104 when the material pushing member reaches the rear wall 34 of material container 14. The actuating means comprises peg-like abutments 152 projecting inwardly from walls 30, 32 of material container 14, and cam-shaped abutments 154 at the upper edge of second wall portion 106.

Figure 7:
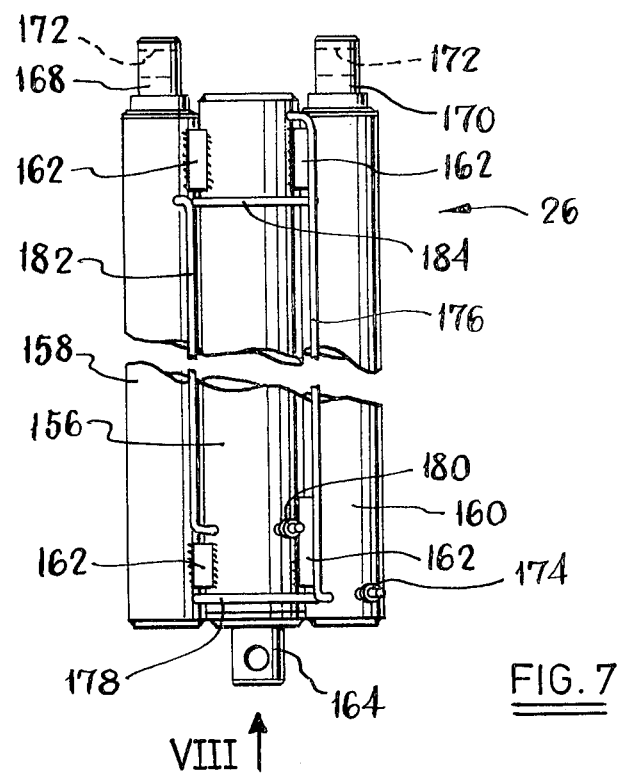
FIG. 7 shows a plan view of a triple ram assembly forming part of drive means to move the material pushing member within the material container, the direction of viewing being indicated by arrow VII in FIG. 1.
Figure 8:
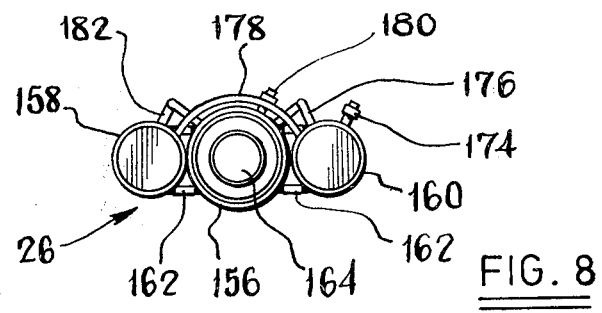
FIG. 8 shows an end view of the triple ram assembly, in the direction indicated by arrow VIII in FIG. 7.

Triple ram 26 is shown in FIGS. 7 and 8. It comprises a large central ram 156 and two smaller rams 158, 160, one on each side. The cylinders of the rams are rigidly joined together by plates 162 welded thereto. The piston rod 164 of central ram 156 is pivotally connected to a bifurcated upstanding bracket 166 on drawbar 16. The piston rods 168, 170 of rams 158, 160 are pivotally connected to nose 126 on first wall portion 104 by a pin (not shown) passing through apertures 130 in the nose and apertures 172 in the piston rods.

Rams 156, 158 and 160 are conventional double acting rams. A hydraulic fluid connector 174 opens directly into the headside chamber of ram 160 which is connected by pipes 176, 178 to the headside chambers of rams 156 and 158 respectively. A hydraulic fluid connector 180 opens directly into the rodside chamber of ram 156 which is connected by pipes 182, 184 to the rodside chambers of rams 158 and 160 respectively.

The displacement per unit length of rams 158 and 160 are equal and their sum is equal to that of central ram 156. Consequently, the rate of extension of the ram as a whole with a constant rate of supply of hydraulic fluid, is constant and does not depend on which piston extends first or whether all three pistons extend simultaneously.

Hydraulic fluid connectors 174, 180 on triple ram 26 are connected by hoses 184, 186 to pump 92. Pump 92 includes a manually operable valve assembly (not shown) whereby the direction of supply of fluid is controlled (to extend or retract the ram) and whereby the rate of supply is steplessly variable from zero to the full delivery rate of the pump.

Pump 92 itself is driven by shaft 86 and comprises a reciprocating piston driven by a rotating cam. The rate of fluid output of the pump is controlled by restricting (by means of the valve) the rate of fluid input to the pump i.e. by suction side control.

In use, material container 14 is filled with manure or slurry, with material pushing member 22 in its most forward position as indicated in full lines in FIG. 1.

When it is desired to commence spreading, the p.t.o. clutch on the tractor is engaged so as to rotate input shafts 82 and 86. Rotor 18 is thereby rotated and pump 92 delivers fluid to ram 26 which begins to move material pushing wall 22 rearwards. The rotor discharges the material over rear wall 34 in a finely divided state at the rate at which the material is fed to it by wall 22.

The rate of discharge is controlled by varying the output of pump 92. This enables the rate of extension of the ram to be matched to the power available from the tractor's p.t.o. shaft. If the power absorbed by rotor 18 begins to pull down the tractor's engine, then the rate of extension of ram 26 can be reduced a little to reduce the power required by the rotor.

When the material pushing member 22 reaches the front edge of rear wall 34, the cam-shaped abutments 154 at the upper edge of second wall portion 106 engage the peg-like abutments in material container 14. The upper edge of second wall portion 106 is thereby prevented from moving rearwards any further.

Accordingly, continued rearward movement of first wall portion 104 causes the second wall portion 106 to pivot relative thereto about pins 144. The lower portion of the second wall portion 106 thereby swings upwardly over the sloping rear wall 34 until ram 26 reaches the end of its stroke. At this point the second in FIG. portion has adopted the attitude shown in dotted lines in FIG. 1 and has lifted up to rotor 18 the last remaining quantity of manure in container 14. In this position, the upper end of pusher plate 108 projects through the opening 138 in second wall portion 106.

When the material pushing wall 22 reaches its rearmost position as shown in dotted lines in FIG. 1, at which position ram 26 is fully extended, the hydraulic supply to the ram is reversed by means of the valve in pump 92, and the wall is returned to its forward position once again.

Among the advantages provided by the above embodiment of the invention are the following:

1. because the unloading rotor operates to unload material over a wall of the container, the implement is capable of spreading liquid manure or slurry effectively. The container is merely filled with liquid manure and the material pushing member 22 maintains the rotor 18 at the optimum degree of immersion throughout the time taken to discharge manure;

2. because the rotor is spaced above the level of the bottom of material container 14 and the material pushing member feeds manure to it, the rotor can be made relatively small and only one rotor is needed to discharge practically all of the material in the container. This reduces the initial cost of the implement;

3. the small size of the rotor contributes to a relatively low start-up torque requirement by the implement. This advantage also derives in part from the fact that the rotor is not buried in manure during loading of the implement;

4. because the rotor unloads material over a wall of the container, the manure container in combination with the material pushing member can easily be made liquid-tight whereby problems of leakage during road transport are minimized;

5. the disposition of the rotor in relation to the material container allows the use of a rotor which contacts the material to be unloaded only at the rotor's outermost extremities. Such a rotor provides a better spread pattern than other rotors;

6. the provision of a material container having a sloping rear wall below the rotor — although not essential as regards the broadest aspect of the invention — assists in the feeding of solid manure up to the unloading rotor thereby providing the implement with the ability to spread a very wide range of material consistencies from liquid or thick liquid to solid;

7. the provision of a material pushing member to move the manure to the rotor allows the rotor to be mounted at a fixed position whereby the drive for the rotor is simple in construction as compared with the drive for a rotor which itself moves lengthwise of the manure container.

Figure 9:
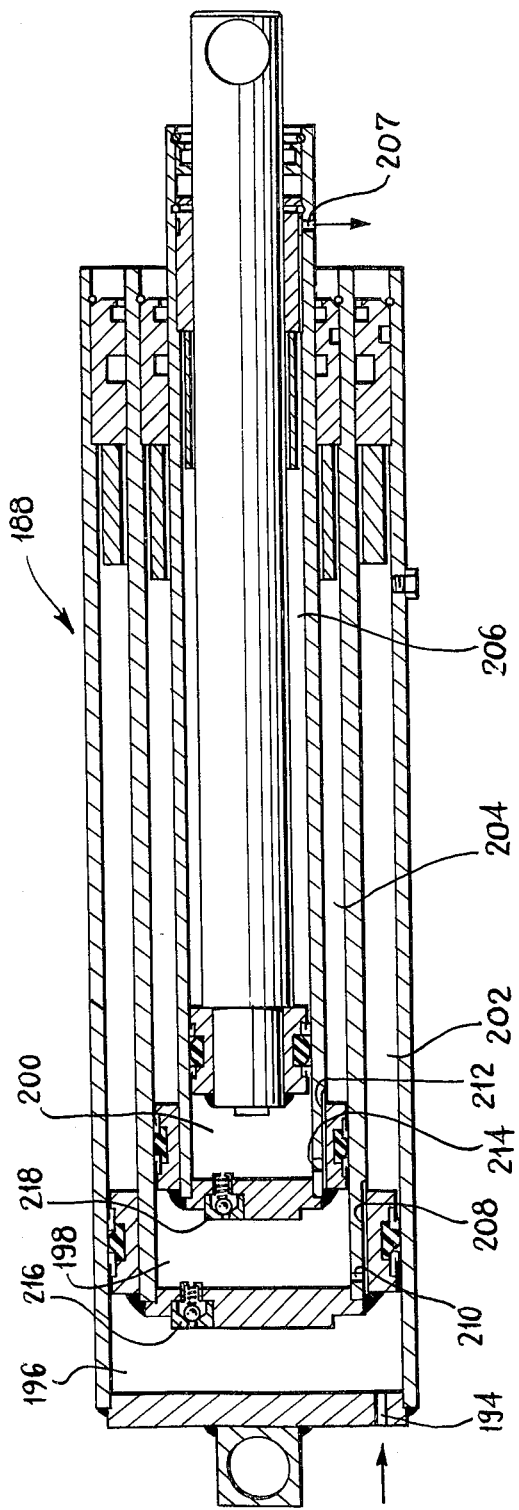
FIG. 9 shows a longitudinal section through a telescopic ram which can be used in place of the triple ram of FIGS. 8 and 9.
Figure 10:
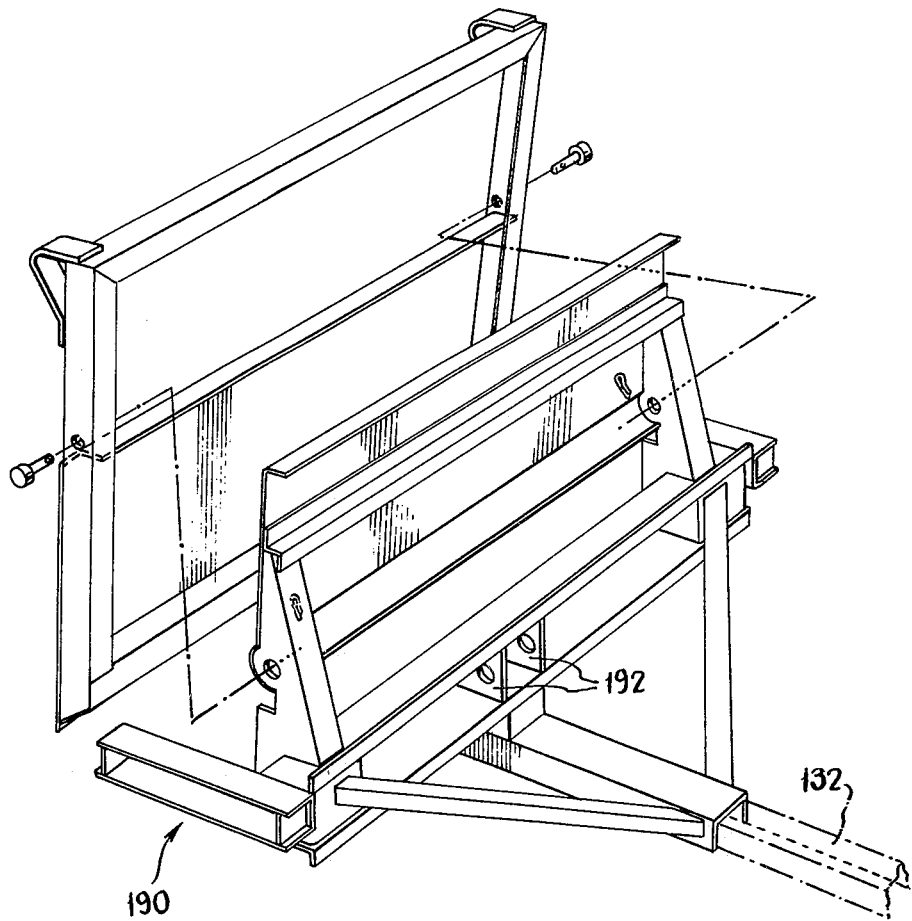
FIG. 10 shows, in a view similar to that of FIG. 6, a modified material pushing member suitable for use with the telescopic ram of FIG. 9.

FIGS. 9 and 10 illustrate a telescopic ram 118 and a material pushing member 190 which can be used in place of triple ram 26 and material pushing member 22 in the embodiment of FIGS. 1 to 8.

Ram 188 achieves the same extended length as ram 26 while being slightly shorter when fully retracted. Accordingly a nose corresponding to nose 126 on material pushing member 22 is not required on material pushing member 190. Instead, it is provided with a pair of apertured plates 192 to which one end of ram 188 is pivotally connected. The other end of the ram is pivotally connected to a bracket on the drawbar as in the previous embodiment.

The construction of material pushing member 190 is otherwise very similar to that of the corresponding item shown in FIG. 6 and will not therefore be described any further. The function of member 190 is identical to that of member 22 in FIG. 6.

The internal construction of ram 188 is shown in FIG. 9. The details of the construction will be easily apparent to those skilled in the art from a study of FIG. 9 and for that reason are not fully described.

It suffices to say that ram 188 comprises a first fluid inlet and outlet opening 194, three headside chambers 196, 198, 200, three annular rodside chambers 202, 204, 206 and a second fluid inlet and outlet opening 207. Rodside chambers 202 and 204 open into headside chambers 198 and 200 respectively via passages 208, 210 and 212, 214 respectively.

Opening 207 leads directly to rodside chamber 206. Ball valves 216 and 218 provide one way communication between headside chambers 196 and 198, and between headside chamber 198 and 200 respectively.

Ram 188 is double acting and all three pistons necessarily move relative to each other continuously during both extension and retraction of the ram.

Figure 11:
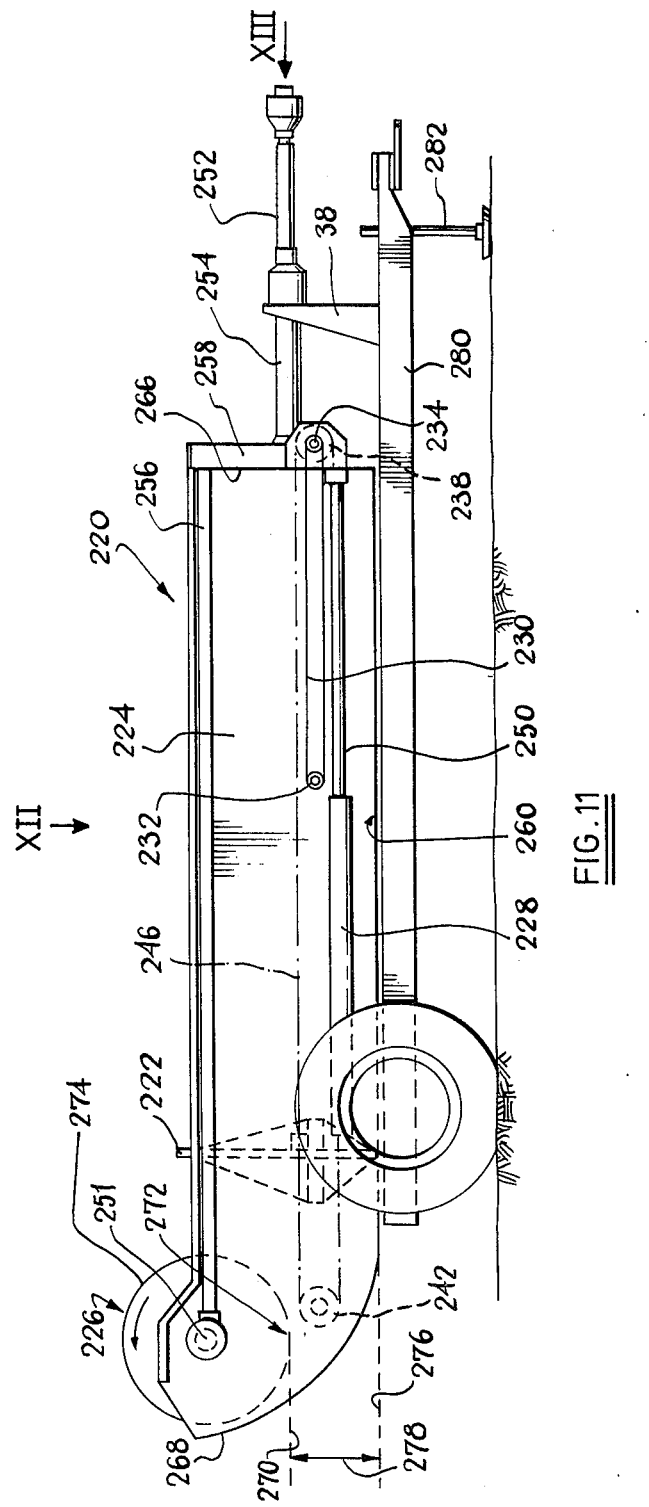
FIG. 11 shows in side elevation, a material unloading implement constituting another embodiment of the invention.
Figure 12:
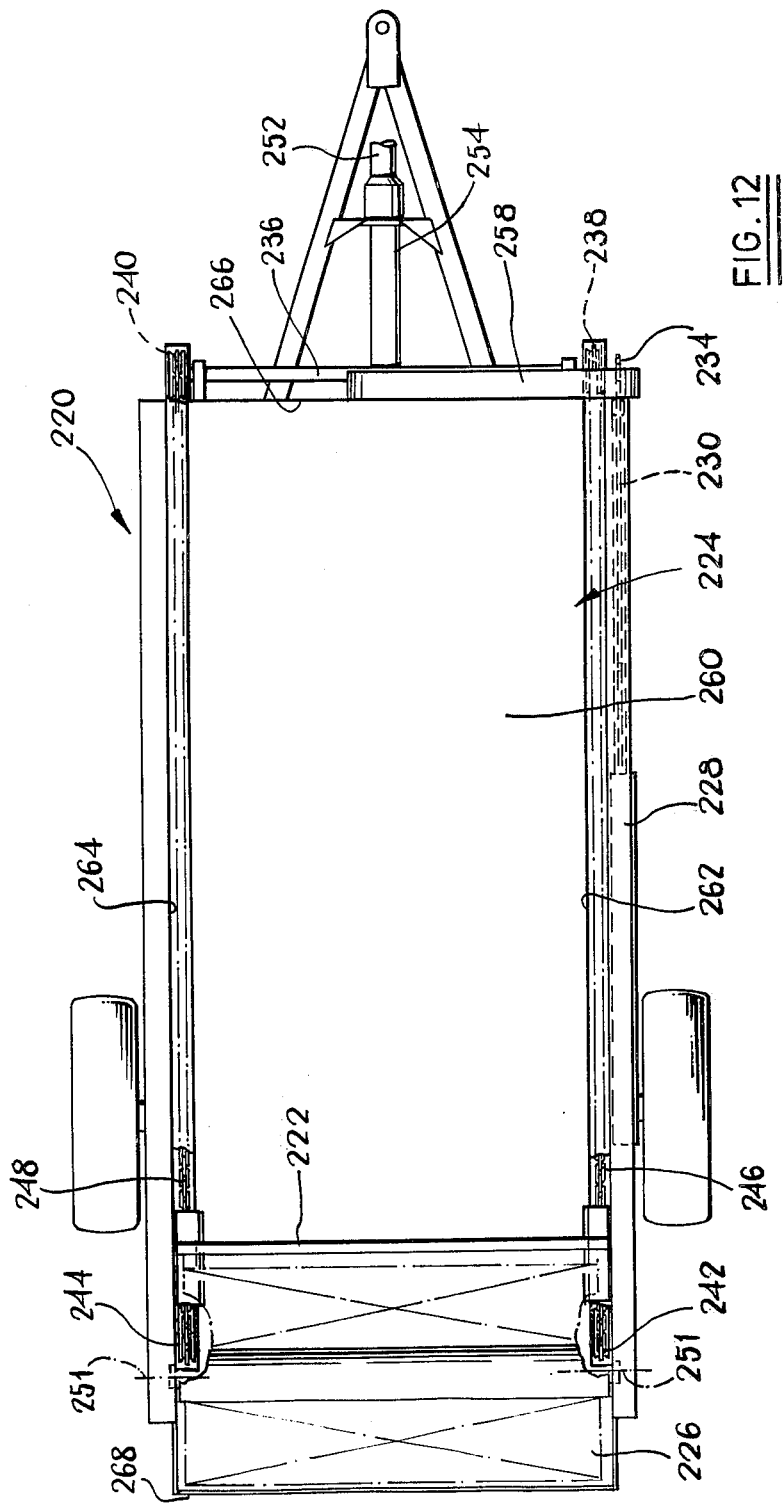
FIG. 12 shows a plan view of the implement of FIG. 11 as indicated by arrow XII therein.
Figure 13:
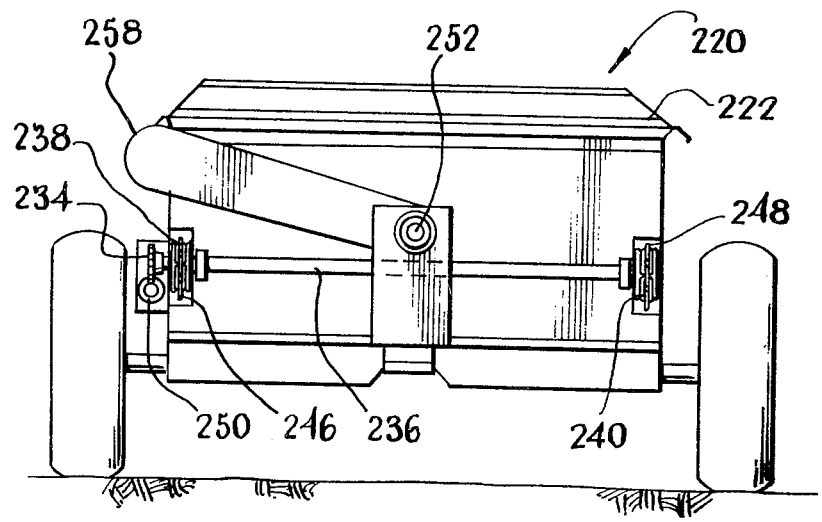
FIG. 13 shows an end elevation of the implement as indicated by arrow XIII in FIG. 11.

The material unloading implement 220 illustrated in FIGS. 11, 12 and 13 differs from those of FIGS. 1 to 10 principally in the mechanism for moving the material pushing member 220 within the material container 224 towards the material unloading rotor 226. Also the material container is closed at both ends.

The mechanism for moving material pushing member 222 is more fully described in our co-pending United Kingdom patent application No. 20667/74 filed 10th May 1974. Briefly, the mechanism comprises a double-acting hydraulic ram 228, an endless roller chain 230 mounted on sprockets 232, 234, a transverse shaft 236 (see FIG. 12) having pocket wheels 238, 240 one at each end, pocket wheels 242, 244 at the other end of container 224, and link or anchor-type chains 246, 248 connected to the material pushing member. Thrust from the piston 250 of ram 228 is transmitted through the chains 230, 246 and 248 to the material pushing member whereby the ram can move the latter forwards or rearwards.

Rotor 226 is rotated about its axis 251 by shafts 252, 254, 256 and a roller chain drive 258 in a manner similar to the rotor 18 of the previous embodiment. The rotor itself has the same construction as rotor 18 and is provided with a hood or shield (not shown) similar to hood 68.

Material container 224 comprises a flat base wall 260, side walls 262, 264, a front wall 266 and a sloping rear wall 268. The base wall is horizontal when the implement is in its working attitude on horizontal ground as shown in FIG. 11.

The spatial relationship between material unloading rotor 226 and material container 224 is substantially the same as in the previous embodiment. That is to say, a horizontal plane 270 touching the lowest point 272 on the circular path 274 described by the radially outermost portions of the rotor is spaced above a horizontal plane 276 touching the lowest point in the material container. The spacing 278 between the two planes is approximately equal to the radius of circular path 274.

Material pushing member 222 is mounted for sliding movement lengthwise of container 224 on rails (not shown), one on each side wall 262, 264 of the container — as in the embodiment of FIGS. 1 to 8.

Implement 220 has a drawbar 280 and retractable parking stand 282. Hoses (not shown) are provided to connect ram 228 to the hydraulic system of a tractor hauling the implement whereby movement of pushing member 222 can be controlled by a spool valve.

In use ram 228 is extended and retracted to move material pushing member 222, and manure within the material container is discharged in a manner similar to that of the previous embodiments.

Figure 14:
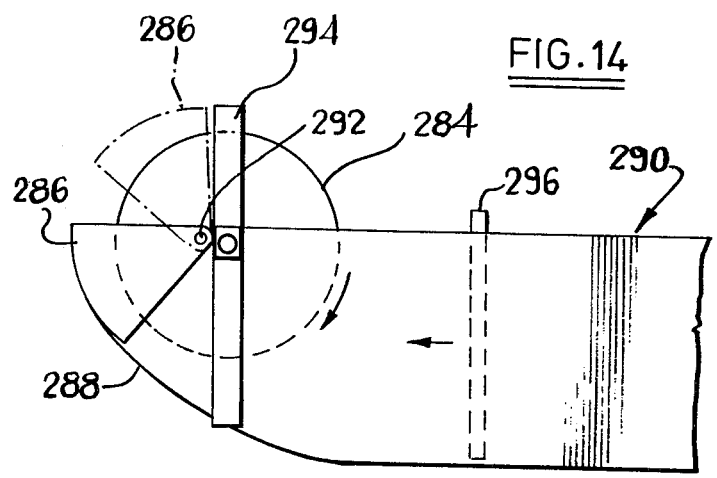
FIG. 14 shows, diagrammatically, in side elevation, a material unloading implement incorporating a modification applicable to the other embodiments.

FIG. 14 illustrates, diagrammatically, a modification applicable to the embodiments described above. The material unloading rotor 284 rotates in the opposite direction to the rotors of the previous embodiments, and to facilitate discharge of manure, the upper portion 286 of the rear wall 288 of material container 290 is mounted on aligned transverse pivot pins 292 so as to be movable between a manure-retaining position shown in full lines and a raised manure-releasing position shown in broken lines. In its raised position, wall portion 286 is located above rotor 284 against a transverse frame 294 and constitutes a manure deflector or shield for the rotor. Manure is pushed to the rotor by a wall 296 as in the previous embodiments.

Automatic or manually operable means (not shown) may be provided for raising wall portion 286 when spreading is commenced.

Modifications which can be made in the above embodiments without falling outside the scope of the invention include the following:

1. the use of alternative mechanisms for moving the material pushing members, for example a mechanical drive powered by the tractor p.t.o.;
2. other forms of material unloading rotor may be employed;
3. the container need not be of any particular cross sectional shape nor need it have a flat base wall or floor. The container may be cylindrical or part-cylindrical-
4. the material container need not be provided with a sloping rear wall. Such a sloping wall is particularly valuable in guiding solid manure up to the discharge rotor but it is not essential for handling liquid manure;
5. the spacing 66 between planes 58 and 64 (see FIG. 1) should be in the range of one half to one and a half times the radius of rotor circle 62, but the spacing may be less then this if desired and the advantages of the invention may be obtained with a spacing as small as 10 centimetres since in a conventional spreader, inability to spread the last remaining 10 centimetres of manure in the bottom of the container would amount to a serious reduction in capacity of the implement.

The term spaced as used in the claims of this specification in this context is to be construed accordingly. It of course does not mean that there may be just sufficient clearance to prevent the rotor touching the base of the material container;
6. the valve in pump 92 (see FIG. 2) could be provided with remote control means, or the valve could be placed on the tractor. Also a remotely operable clutch could be provided in the drive to rotor 18;
7. two or more unloading rotors may be provided if desired;
8. the implement may be used for unloading material other than manure or slurry such as the discharging of animal feed into feed bunks.

I claim:

1. A material unloading implement comprising
a material container;
a material unloading rotor mounted on the material container and operable to unload material therefrom;

material feed means operable to feed material within the container to the material unloading rotor;

characterized in that the material container includes an upwardly extending rear wall at the rear thereof below the material unloading rotor, said rear wall sloping downwards and forwards from the material unloading rotor;

the material unloading rotor is mounted on the container at the rear of the implement for rotation about a horizontal axis extending transverse to the direction of usual forward motion of the implement, adjacent and upwardly extending wall of the container and is operable to unload material from within the container over said wall, the material unloading rotor being mounted at a level such that when the material unloading implement is in its working attitude and is standing on horizontal ground, a horizontal plane touching the lowest point on the circular path described by the radially outermost portions of the rotor is spaced above a horizontal plane touching the lowest point in the material container; and the material feed means comprises a material pushing member mounted in the material container so as to be movable towards the material unloading rotor, and drive means to move the material pushing member whereby the material pushing member moves material within the container towards the material unloading rotor.

2. An implement according to claim 1 characterized in that the material pushing member is in the form of a wall comprising a first wall portion mounted so as to remain in a fixed attitude relative to the material container as the material pushing member moves within the container, and a second wall portion pivotally mounted on the first wall portion and located at the rear side thereof, actuating means being provided to effect pivotal movement of the second wall portion when the material pushing member reaches the rear wall of the material container.

3. An implement according to claim 2 characterized in that the actuating means comprises an abutment on the material container engageable with an abutment on the second wall portion whereby rearwards movement of the material pushing member after engagement of the abutments effects said pivotal movement of the second wall portion.

4. An implement according to claim 2 characterized in that the upper end of the second wall portion is formed with an aperture through which the upper portion of the first wall portion extends after said pivotal movement of the second wall portion.

5. An implement according to claim 1 characterized in that the rear wall of the material container includes an upper portion which is movable from a material-retaining position to a material releasing position.

6. An implement according to claim 5 characterized in that said upper portion of the rear wall is mounted for pivotal movement about an axis parallel to the axis of rotation of the rotor between said material retaining and material releasing positions, the wall portion being located above the rotor when in said material releasing position and thereby constituting a material deflector or shield therefor.

7. An implement according to claim 6 characterized by automatic means operative to raise the wall portion when unloading is commenced.

* * * * *